No. 649,857. Patented May 15, 1900.
A. L. MURPHY.
ART OF MANUFACTURING TUBES OR PIPES.
(Application filed Sept. 22, 1899.)
(No Model.)
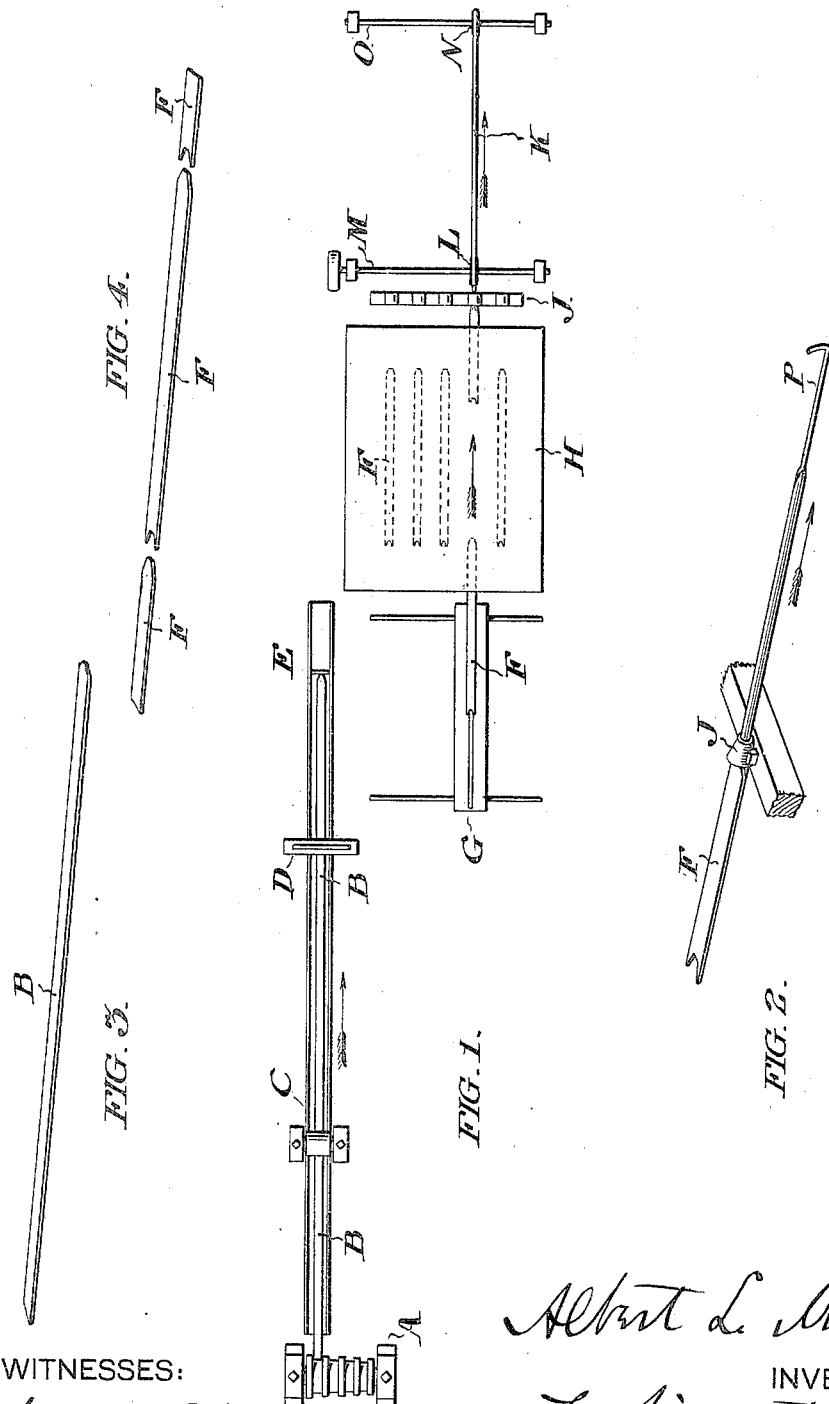
WITNESSES:
INVENTOR:
Albert L. Murphy

UNITED STATES PATENT OFFICE.

ALBERT L. MURPHY, OF CONSHOHOCKEN, PENNSYLVANIA.

ART OF MANUFACTURING TUBES OR PIPES.

SPECIFICATION forming part of Letters Patent No. 649,857, dated May 15, 1900.

Application filed September 22, 1899. Serial No. 731,250. (No specimens.)

*To all whom it may concern:*

Be it known that I, ALBERT L. MURPHY, a citizen of the United States, residing at Conshohocken, in the county of Montgomery, in the State of Pennsylvania, have invented certain new and useful Improvements in the Art of Manufacturing Tubes or Pipes, of which the following is a specification.

My improvements relate broadly to the art of manufacturing upon a commercial scale, butt welded and lap welded iron or steel tubes or pipes, and although I herein illustrate in the drawings in somewhat diagrammatic fashion, machinery employed in the manufacture of butt welded pipe, and do not illustrate machinery for forming lap welded pipe, it is to be understood, that my invention relates to both kinds of pipe, and not to the machinery employed in their formation.

Hitherto, in the manufacture of tubes and pipes, it has been the practice to first bring to a white heat the piles or billets and pass them through rolls for the production of plates, and to cut the plates as they emerge from the rolls, and while still at a red heat, into blanks, termed pipe strips, of appropriate dimensions according to the pipe lengths desired.

In the present practice butt-welded tubes are formed by drawing pipe strips at a welding heat through a tapering or bell-shaped die, which, as the strips are drawn through it, progressively transforms them into tubular form, presenting and pressing against each other and causing to be welded together, the opposing edges of the strips.

To draw the strip through the die it is necessary that the advance end of the former should be tapered off, so that the inclined bore of the die will act against its inclined side faces to impart to it the necessary curvature to form the pipe.

Hitherto, therefore, the plates which emerge at a red heat from the rolls, have been cut into lengths or "pipe strips," as stated, by a dividing cutter or shears which severs them on lines of division perpendicular to their length, and the square advance ends of said strips, when cold, have been subsequently trimmed off or tapered by an independent pair of tapering shears, as I term them, between the jaws of which one end of each strip has been inserted.

As much handling and manipulation of the strips is involved in their presentation to the tapering shears, the red hot strips have, after leaving the dividing shears, and before such operation, been piled up and cooled off.

After the cold strips have been tapered by the tapering shears, as described, they have been delivered within a suitable furnace where they are heated to a welding heat, and thereupon drawn through the die to form the tubes.

Incident to the practice described has been the disadvantage that two distinct cutting or shearing operations have been performed, namely, first, the cutting to length in which the strips are cut in planes perpendicular to their axes, and secondly, the tapering operation in which the advance corners of the strips are removed.

A still further and much greater disadvantage has been that in the described practice, the heat imparted to the metal to prepare it for the rolling operation, and a large part of which remains in the strips when they emerge from the rolls, has been lost, with the result that it is necessary, when subsequently imparting to the strips their welding heat, to begin the operation upon said strips when they are cold.

It is the object of my invention to improve the art of manufacturing pipes by following a process in the practice of which practical and economic results are attained which effect a great cheapening in the cost of production.

In my improved process of manufacturing butt-welded pipe, as in the former practice, I divide the rolled plates at the high and usually red heat at which they emerge from the rolls, but, in dividing the plates into pipe strips of suitable length I effect such division by the employment of shears of special form, which not only divide the plates into lengths, but also cut the advance end of each length, as thus separated from the preceding length, into the ultimate tapered form desired in the strip.

I then charge the strips, which are still at a high heat, and usually one by one as fast as they have been acted upon by the shears—to the welding furnace, which imparts to them the degree of heat required for the welding operation, and known as the welding heat.

In the last mentioned step, inasmuch as the strips are at a high heat when charged to the welding furnace, instead of cold as in the practice hitherto in vogue, the time and expenditure in fuel, required to bring them to the final welding heat, is very materially reduced, as in the operation of bringing the strips to the welding heat I utilize the high heat already inhering in said strips.

In other words, in my improved process, the duration of the heating operation required to bring the strips to a white or welding heat is very brief. This is for the reason that the metal piles or billets prior to their presentation to the rolls to be transformed into plates are brought to a white heat, and after the completion of the operations of the rolls and shears the pipe strips are still at a high heat; said strips are thereupon charged to the welding furnace immediately and while they still retain a red or high heat with the result that a very short exposure of the strips to the heat of the welding furnace will be sufficient to bring them to the required white or welding heat.

In the old practice, the duration of the operation of bringing the pipe strips to a welding heat was very much longer, inasmuch as said strips were cold when brought to the welding furnace.

My improved process, therefore, in bringing pipe strips or skelp to a welding heat, for the production of tubes, utilizes the heat which has been imparted to the metal preparatory to the formation of the strips, and which has in the manufacture of butt welded tubes been diminished only by exposure of the metal to the air during the time it has been passing through the rolls and under the shears, and by such utilization, as is obvious, effects a great saving in fuel and time.

In the ordinary and preferred practice of the method devised by me, the strips are at a red heat as they come from the shears and are charged to the welding furnace.

It is to be understood, however, that my invention may be practiced, although with a proportionate diminution of the economic result if said strips when charged to the welding furnace should not be at a red heat but should by delay in their transit from the shears to the welding furnace, or otherwise, be reduced to a temperature which while still high is not accompanied by redness of the metal.

In other words, my invention comprehends the charging of the pipe strips to the welding furnace at a time when they still retain a high degree of heat from the initial heat imparted to the piles or billets, even if said heat should be less than a red heat, as for instance, a black heat, which represents a temperature of several hundred degrees.

Furthermore, while I have herein referred to the removal of the pipe strips and their subjection to the welding furnace as fast as cut by the shears, it is of course to be understood that the language referred to will cover a method of procedure such as that resorted to in the application of my invention to the manufacture of lap welded tubes, in which, after operation of suitable shears which divide the plates into pipe strips or lengths, said strips are subjected to the action of a suitable bending apparatus to form lap skelp, which lap skelp are, while still hot with the original billet or pile heat, quickly and systematically inserted within the welding furnace.

In the formation of either lap welded or butt welded tubes or pipes, it is to be understood that the statement that the pipe strips are while still hot with the original pile or billet heat, subjected to the welding furnace, covers a method of procedure in which the strips are after the operation of the shears caused to rest in the course of their transit to and insertion within the welding furnace such as would be involved in the practice of permitting a small number of the strips to accumulate in the vicinity of the shears continuously adding to such small number the strips taken from the shears and continuously on the other hand reducing said small number by taking away the hot strips for insertion in the welding furnace, either directly as when forming butt-welded pipes, or after subjection to the bending apparatus as in the case of the formation of lap welded tubes,— the individual strips in such small temporary accumulation not remaining long enough to be more than slightly diminished in temperature.

In the accompanying drawings I illustrate diagrammatically, or in dummy plan, so to speak, apparatus for use in connection with the practice of my improved process, of making butt-welded tubes.

In said drawings, Figure 1 is a top plan view, of the foregoing character, of apparatus, comprising rolls, a cutting apparatus, a welding furnace, and a series of dies.

Figure 2 is a view in perspective of one of the bell dies, illustrating a pipe strip as passing through it.

Figure 3 is a view in perspective of a plate of the character produced by the rolls, its advance end, however, having been shaped by the cutting apparatus.

Figure 4 is a view in perspective of a pipe strip showing the rear portion of the preceding strip and the front portion of the succeeding strip, the view being designed to illustrate the character of the cut or division made by the shears.

Similar letters of reference indicate corresponding parts.

All the parts contemplated to be used in the manufacture of the lap welded tube in the practice of my process are of usual character, and are, therefore, not illustrated.

The arrangement of apparatus illustrated in the drawings, and as stated, employed in connection with the manufacture of butt-welded pipes is as follows:

A indicates rolls in which billets or piles are by usual and well known operations of rolling, transformed into plates B, which emerge therefrom upon a chute or carrier C of any preferred character.

Near the outer end of the carrier C is a shears or cutting apparatus D, adapted to form the angular cuts or divisions required to produce the necessary taper in the advance end of each of the pipe strips into which it divides the plates.

The shears or cutting apparatus, the details of construction of which I do not herein claim or seek to cover, has a blade or blades of such form or arrangement as by a single operation to divide the plate and shape the strip ends.

E is a stop or gage plate mounted on the outer end of the carrier, with which the front end of the metal makes contact. The position of the stop with reference to the shears or cutting apparatus, of course, determines the length of the pipe strip cut.

G is an automatic charger to which the strips F may be manually or otherwise transferred from the carrier, and by which they are carried to and discharged within the welding furnace H.

J are a series of bell dies disposed in line with the heating chambers of the furnace, and K is a traveling chain, belt, or similar device, adapted to engage or be connected with tags P, Figure 2, attached in any preferred manner to the pipe strips, and the travel of which chain or belt exerts traction upon the strips through the tags, and draws the strips through the dies.

The belt or chain K is in Figure 1 shown as mounted upon a chain wheel L carried by a power driven shaft M, and a wheel N mounted upon an idle shaft O.

The wheels L N may be shifted along their shafts into registry successively with the several dies, by any suitable shifting mechanism.

It is understood that any suitable apparatus may be employed to carry my invention into practice.

After the formation of the tubes in the dies they are, of course, subjected to such finishing operations, including the trimming off of their ends, as may be necessary and desirable.

Referring now to lap-welded tubes: Heretofore in the formation of such tubes, the iron piles or billets have been rolled into flat plates with scarfed edges, and thereupon while still hot divided into suitable lengths, which lengths have been permitted to become cold, have been then heated in a furnace to bring them to a bending heat, then bent to form "lap skelp," and later have been charged to a welding furnace to bring them to a welding heat.

After the strips or lap skelp, as they are termed after being bent, have been brought to a welding heat, they have been passed through rolls of the usual character employed in the manufacture of lap-welded tubes, and discharged.

In my improved process as applied to the manufacture of lap-welded tubes, I take the lengths, immediately after they have been acted upon by the shears, and while still at a red heat, and first bend them into a tubular form with overlapped edges, termed "lap skelp," and then charge them directly and without permitting them to become cold, into the welding furnace.

As a result of this practice, the welding furnace in bringing the lap skelp to a welding heat, acts upon the skelp which contain high heat received by the metal while in the form of billets or piles.

In the practice of my process, therefore, in the production of lap welded tubes, I dispense with the special heating which the cold pipe strips have heretofore received preparatory to their subjection to the bending apparatus, and, therefore, but little time and fuel are expended in connection with my process.

The feature of operating upon the plates while still hot by cutting apparatus which not only divides them transversely of their length into pipe strips but also forms a tapered cut end, is herein claimed as one of a series of steps involved in my improved process of making pipe; claims for such feature broadly and apart from the other steps set forth herein is made in an application for Letters Patent filed by me on March 24, 1900, as Serial No. 9,993.

Having thus described my invention, I claim—

1. The process of making butt and lap-welded pipes and tubes, which consists, first, in heating suitable piles or billets and reducing them by a rolling operation into plates; second, in dividing said heated plates into pipe strips; third, in immediately charging said heated strips as fast as cut to a superheating or welding furnace and bringing them to a welding heat; and, fourth, in subjecting said strips while at a welding heat to dies or rolls which fashion them into pipes or tubes, as specified.

2. The process of making butt-welded pipes, which consists in heating suitable piles or billets; reducing them by a rolling operation into plates; dividing said plates while in a heated condition into strips, lengths, or sections, the front ends of which are tapered; immediately charging said heated strips to a superheating or welding furnace and bringing them therein to a welding heat; and drawing said strips while at a welding heat through a bell die, as specified.

3. The improvement in the art of making butt and lap-welded pipes and tubes, which consists, first, in heating suitable piles or billets and reducing them by a rolling operation into plates; second, in dividing said plates while still hot into pipe strips; third, in regularly charging successive pipe strips while they contain substantially uniform amounts of the heat imparted in the first named operation to a superheating or welding furnace and bringing them to a welding heat; and, fourth, in subjecting said strips while at a welding heat to dies or rolls which fashion them into pipes or tubes, as specified.

4. The process of making butt-welded pipes, which consists in heating suitable piles or billets; reducing them by a rolling operation to plates; dividing said plates while in a heated condition into strips, lengths, or sections, the front ends of which are tapered; immediately charging said heated strips and while at a red or high heat to a superheating or welding furnace and bringing them therein to a welding heat; and drawing said strips while at a welding heat through a bell die, as specified.

5. The process of making butt-welded pipes, which consists in heating suitable piles or billets, rolling them into plates, subjecting said plates while still hot to a series of single cutting operations in each of which a strip is severed from a plate and a tapered end formed, charging said strips while still hot to a superheating or welding furnace and bringing them therein to a welding heat, and drawing said strips while at a welding heat through a bell die, as specified.

In testimony that I claim the foregoing as my invention I have hereunto signed my name this 16th day of September, A. D. 1899.

ALBERT L. MURPHY.

In presence of—
F. NORMAN DIXON,
THOS. K. LANCASTER.